US010421617B2

(12) United States Patent
Koenig (10) Patent No.: US 10,421,617 B2
(45) Date of Patent: Sep. 24, 2019

(54) CANTILEVERED SCREW ASSEMBLY WITH SPEED REDUCER AND PIVOTING TORQUE ARM

(71) Applicant: Mark E Koenig, Pickerington, OH (US)

(72) Inventor: Mark E Koenig, Pickerington, OH (US)

( * ) Notice: Subject to any disclaimer, the term of this patent is extended or adjusted under 35 U.S.C. 154(b) by 14 days.

(21) Appl. No.: 15/637,811

(22) Filed: Jun. 29, 2017

(65) Prior Publication Data

US 2019/0002205 A1  Jan. 3, 2019

(51) Int. Cl.

| B65G 33/32 | (2006.01) |
|---|---|
| B65G 33/34 | (2006.01) |
| B65G 33/26 | (2006.01) |
| B30B 9/30 | (2006.01) |
| B30B 3/00 | (2006.01) |
| B02C 19/22 | (2006.01) |

(52) U.S. Cl.
CPC ............ B65G 33/32 (2013.01); B30B 9/3089 (2013.01); B65G 33/265 (2013.01); B65G 33/34 (2013.01); B02C 19/22 (2013.01); B30B 3/00 (2013.01)

(58) Field of Classification Search
CPC ...... B65G 33/32; B65G 33/265; B65G 33/34; B65G 33/36; B65G 33/38; B02C 19/22; B30B 3/00
See application file for complete search history.

(56) References Cited

U.S. PATENT DOCUMENTS

| 2,812,054 A | 11/1957 | Dorris et al. |
| 3,968,998 A | 7/1976 | Wolf |
| 4,679,464 A | 7/1987 | Castellani |

(Continued)

FOREIGN PATENT DOCUMENTS

| CN | 2659745 Y | 12/2004 | |
| GB | 2072122 A | * 9/1981 | ............. B65G 33/14 |

OTHER PUBLICATIONS

Todd R Bobak "Torque Arm Design Considerations for Shaft-Mounted Speed Reducers", Power Transmissions Engineering, Apr. 2008. (Year: 2008).*

(Continued)

*Primary Examiner* — Mark A Deuble
(74) *Attorney, Agent, or Firm* — Standley Law Group LLP; Jeffrey C. Norris; Eric M. Gayan (57) ABSTRACT

A cantilevered screw assembly comprising a speed reducer to facilitate rotation of a screw. The speed reducer may be connected to a torque arm that is adapted to control or limit undesired movement (e.g., wobbling, orbital movement, etc.) of the screw during operation. In effect, one exemplary embodiment of a speed reducer may essentially float on a pivoting torque arm (and the shaft of the screw) such that the torque arm is adapted to limit undesired movement of the speed reducer and screw. As a result, an exemplary embodiment may eliminate the need for alternative drive systems or other means to control undesired movement of the screw. An exemplary embodiment may be particularly useful for light or infrequent duty or other small-scale applications to reduce the likelihood of a breakage of a screw or another portion of a cantilevered screw assembly (e.g., the bearing(s) or bearing assembly, the gears, etc.).

44 Claims, 10 Drawing Sheets

(56) References Cited

U.S. PATENT DOCUMENTS

| | | | | |
|---|---|---|---|---|
| 4,938,426 | A | * | 7/1990 | Koenig ............... B02C 18/0084 |
| | | | | 241/222 |
| 5,108,040 | A | * | 4/1992 | Koenig ................ B30B 11/246 |
| | | | | 241/260.1 |
| 5,167,320 | A | * | 12/1992 | Lucich .................. B65G 33/34 |
| | | | | 198/675 |
| 5,328,015 | A | * | 7/1994 | Volk, Jr. ................ B65G 33/32 |
| | | | | 198/548 |
| 5,373,923 | A | * | 12/1994 | Koenig .................. B02C 19/22 |
| | | | | 188/303 |
| 9,132,968 | B2 | * | 9/2015 | Koenig ................ B65G 33/265 |
| 2005/0184103 | A1 | * | 8/2005 | Palma ................... B65G 33/32 |
| | | | | 222/413 |
| 2011/0247920 | A1 | * | 10/2011 | Marchesini ........... B65G 33/22 |
| | | | | 198/671 |
| 2014/0339346 | A1 | | 11/2014 | Koenig et al. |
| 2015/0202632 | A1 | | 7/2015 | Koenig et al. |

OTHER PUBLICATIONS

Sumitomo, Buddybox, page from catalog, Apr. 13, 2017, 1 page.
Sumitomo, Cyclo BBB4 Manual 1, Manual, May 11, 2017, 8 pages.
Sumitomo, Cyclo BBB4 Manual 2, Manual, May 11, 2017, 179 pages.
Sumitomo, Cyclo BBB4 Manual 3, Manual, May 11, 2017, 345 pages.
Sumitomo, Cyclo BBB4 Manual 4, Manual, May 11, 2017, 9 pages.
Sumitomo, Cyclo BBB4 Manual 5, Manual, May 11, 2017, 51 pages.
Sumitomo, White Paper—Torque Arm, Catalog, May 4, 2017, 16 pages.

* cited by examiner

CANTILEVERED SCREW ASSEMBLY WITH SPEED REDUCER AND PIVOTING TORQUE ARM

BACKGROUND AND SUMMARY OF THE INVENTION

Exemplary embodiments of the present invention relate generally to a cantilevered screw assembly. Examples of cantilevered screw assemblies may include, but are not limited to, augers, compactors, crushers, shredders, feeders, material handlers, bale breakers, briquetters, and autoclave sterilizers. Other applications of cantilevered screw assemblies are also possible. Accordingly, it is not intended to limit the claimed invention to any particular type of cantilevered screw assembly, unless otherwise expressly set forth.

There is a need to improve known cantilevered screw assemblies. A cantilevered screw assembly may provide many advantages over a screw assembly that is not cantilevered. However, a cantilevered screw assembly may also be subject to substantial loads during operation, which may ultimately cause the screw to become unsteady or unstable. For example, increased clearances may develop within or about a bearing assembly due to the loads, which may eventually cause the screw to wobble during operation or exhibit other undesirable movements. For instance, an end portion of the shaft of the screw may exhibit a type of orbital movement (i.e., generally relative to the area where the shaft is cantilevered) due to the forces on the screw. Eventually the undesired movement of the screw during operation may cause the screw or another portion of the screw assembly (e.g., the bearing(s) or bearing assembly, the gears, etc.) to break, which may necessitate the shutdown of the machine and costly repairs.

A cantilevered screw assembly that is designed for heavy duty and/or frequent use may be configured to better handle the loads induced on the screw to limit or reduce any undesired movement of the screw (e.g., wobbling). For example, a chain and sprocket or hydraulic drive system may assist with controlling the loads on the screw. However, as one might expect, a cantilevered screw assembly that is designed for heavy duty and/or frequent use may be larger, heavier, more complex, more elaborate, more costly, etc.

In view of such characteristics or requirements, not all applications demand heavy duty or frequent use of a machine. For example, apartment complexes, hotels, certain food establishments, etc., may only require use of a machine for light loads and/or on an infrequent basis. Accordingly, there is a need for an improved cantilevered screw assembly that is more suitable for lighter duty or smaller-scale operations. In particular, there is a need for a cantilevered screw assembly that is smaller, lighter, less complex, less elaborate, and/or less costly, etc. as compared to a cantilevered screw assembly that is designed for heavy duty or frequent use. As an example, there is a need for a cantilevered screw assembly that may eliminate the need for a chain and sprocket or hydraulic drive system and still offer improved performance, particularly at least for light duty or small-scale operations.

Exemplary embodiments of the claimed invention may satisfy some or all of the aforementioned needs. One exemplary embodiment of the claimed invention may utilize a speed reducer to facilitate rotation of a cantilevered screw. The speed reducer may be connected to a torque arm that is adapted to control or limit undesired movement (e.g., wobbling, orbital movement, shifts in position, etc.) of the speed reducer and screw during operation. In effect, for instance, one exemplary embodiment of a speed reducer may essentially float on a torque arm (and the shaft of the screw) such that the torque arm is adapted to control or limit undesired movement of the speed reducer and screw during operation. As a result, an exemplary embodiment may eliminate the need for alternative drive systems or other means to control undesired movement of the screw. In addition, an example of a speed reducer may be substantially self-contained and therefore eliminate or limit potential problems associated with other heavy duty systems such as a misalignment of gears or leakage of fluids. Furthermore, an exemplary embodiment may be particularly useful for light or infrequent duty or other small-scale applications to reduce the likelihood of a breakage of a screw or another portion of a cantilevered screw assembly (e.g., the bearing(s) or bearing assembly, the gears, etc.). Nevertheless, some exemplary embodiments may also be utilized for heavy or frequent duty or other large-scale applications.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Exemplary embodiments of the present invention are directed to a cantilevered screw assembly, which may also be referred to as a cantilevered auger assembly herein. FIGS. 1-4 show various views of one embodiment of a cantilevered screw assembly 10 comprising a screw (i.e., auger) 12 that may extend at least partially through a material processing chamber 13. In this example, the screw 12 has a shaft 14 that may be hollow or solid. Furthermore, in this example, the shaft 14 is not tapered. However, other types of cantilevered screw assemblies may also benefit from aspects of the present invention. For instance, some embodiments may have a shaft of an auger with a taper, while other embodiments may have a shaft of an auger with a reverse taper. For embodiments that have a shaft with a taper or reverse taper, the degree of the taper or reverse taper may be selected to fit the application of the cantilevered screw assembly.

The shaft 14 (in association with a bearing assembly 15) is cantilevered to a wall assembly 16 of cantilevered screw assembly 10. The wall assembly 16 may include at least one wall 18 to which the shaft 14 is cantilevered. The wall assembly 16 may also include at least one frame structure 20 that is associated with the at least one wall 18. Such frame structure(s) 20 may, for example, serve any of a number of different purposes, including but not limited to: a base structure to facilitate the connection of other components, devices, systems, etc.; a shielding, protective, and/or safety purpose; and/or to connect multiple walls; etc.

Such as shown in the example of FIGS. 1-4, the cantilevered screw assembly 10 further comprises a torque arm 30 that connects a speed reducer 40 to wall assembly 16. The speed reducer 40 is also associated with shaft 14 of screw 12 such that the speed reducer 40 is adapted to facilitate rotation of screw 12. Such operation of screw 12 may induce loads on screw 12 and other portions of cantilevered screw assembly 10. However, as a result of the connection of torque arm 30 to speed reducer 40, undesired movement of speed reducer 40 (and shaft 14) may be controlled or limited during rotation of screw 12. For example, torque arm 30 may control or limit at least one undesired movement such as wobbling, orbital movement, shifts in position, clockwise movement, counterclockwise movement, curved movement, angular movement, vertical movement, horizontal movement, tilting movement, etc. that may otherwise be caused by loads induced on screw 12 during operation.

In this exemplary embodiment, a distal portion 32 of torque arm 30 is connected to speed reducer 40. In particular, at least one bolt 50 (see, e.g., FIG. 4) connects distal portion 32 to speed reducer 40 in this embodiment. Other exemplary embodiments may utilize any other suitable fastener or means of connection. While a direct connection may be typically preferred, other exemplary embodiments may have at least one intervening component (e.g., a plate) between distal portion 32 and speed reducer 40. In addition, a preferred connection between distal portion 32 and speed reduced 40 is fixed. In this example of a fixed connection, distal portion 32 and bolts 50 extend completely around shaft 14 of screw 12 for optimal control and limitation of undesired movement of shaft 14 and speed reducer 40. However, in some other exemplary embodiments, there may be another type of connection (e.g., pivotal) and/or a distal portion of a torque arm may not extend around or may only extend partially around the shaft of the screw.

Figure 1:
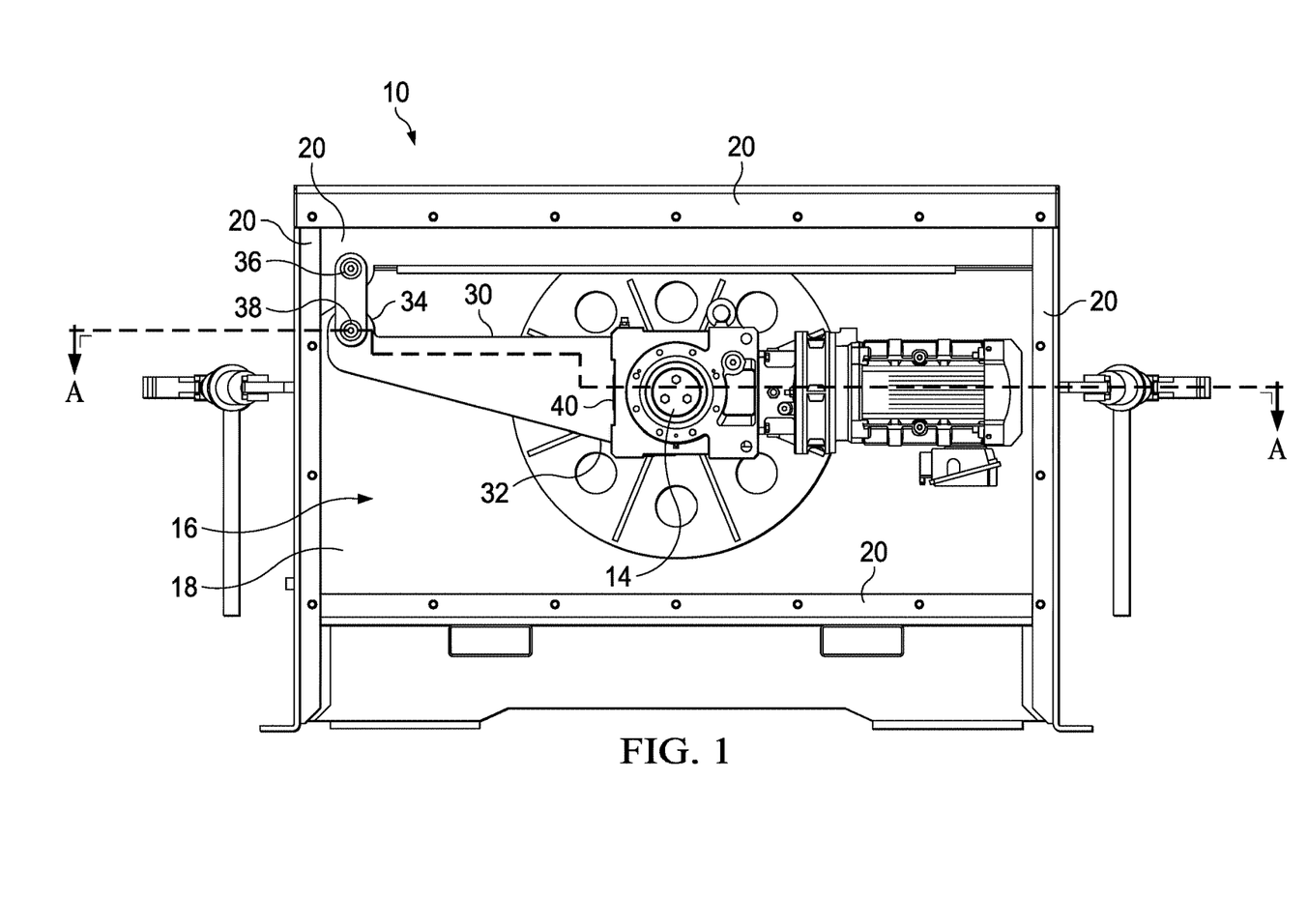
FIG. 1 is a side elevation view of an exemplary embodiment of a cantilevered screw assembly.
Figure 2:
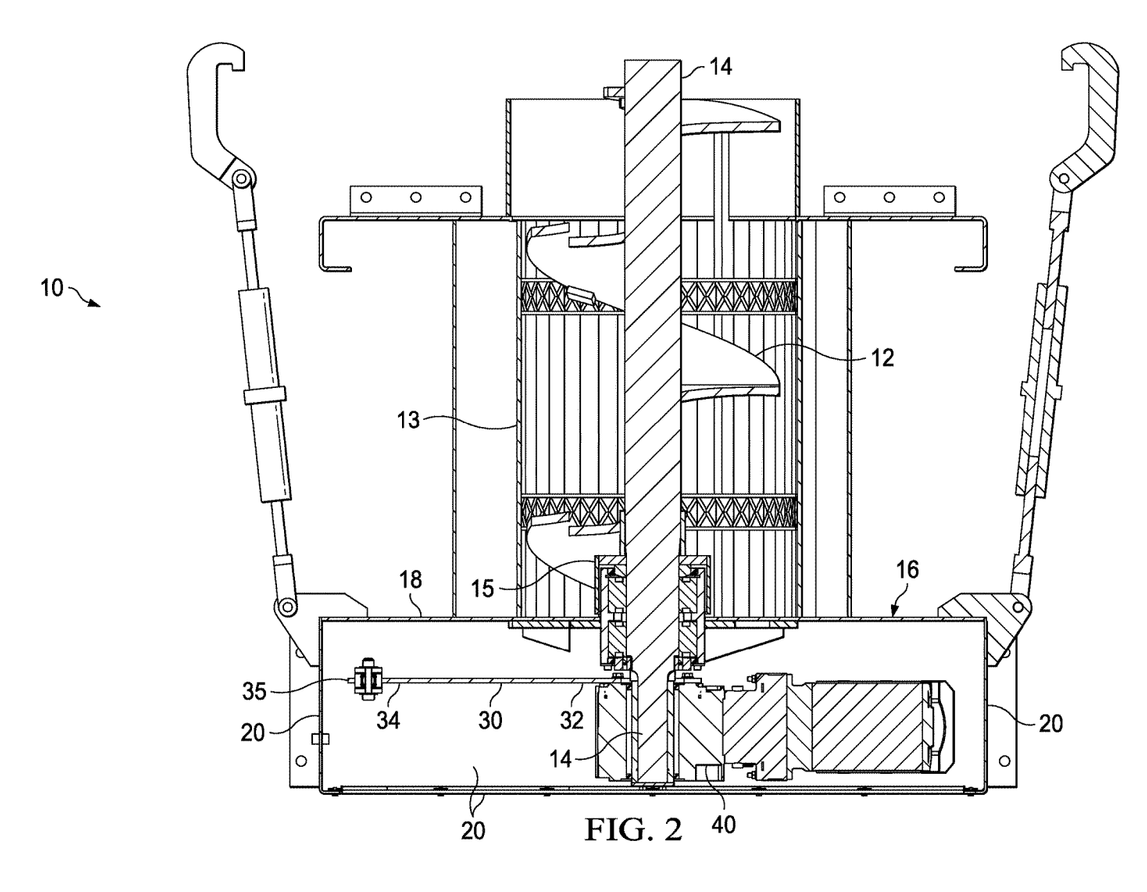
FIG. 2 is a cross-section view taken along line A-A of FIG. 1.
Figure 3:
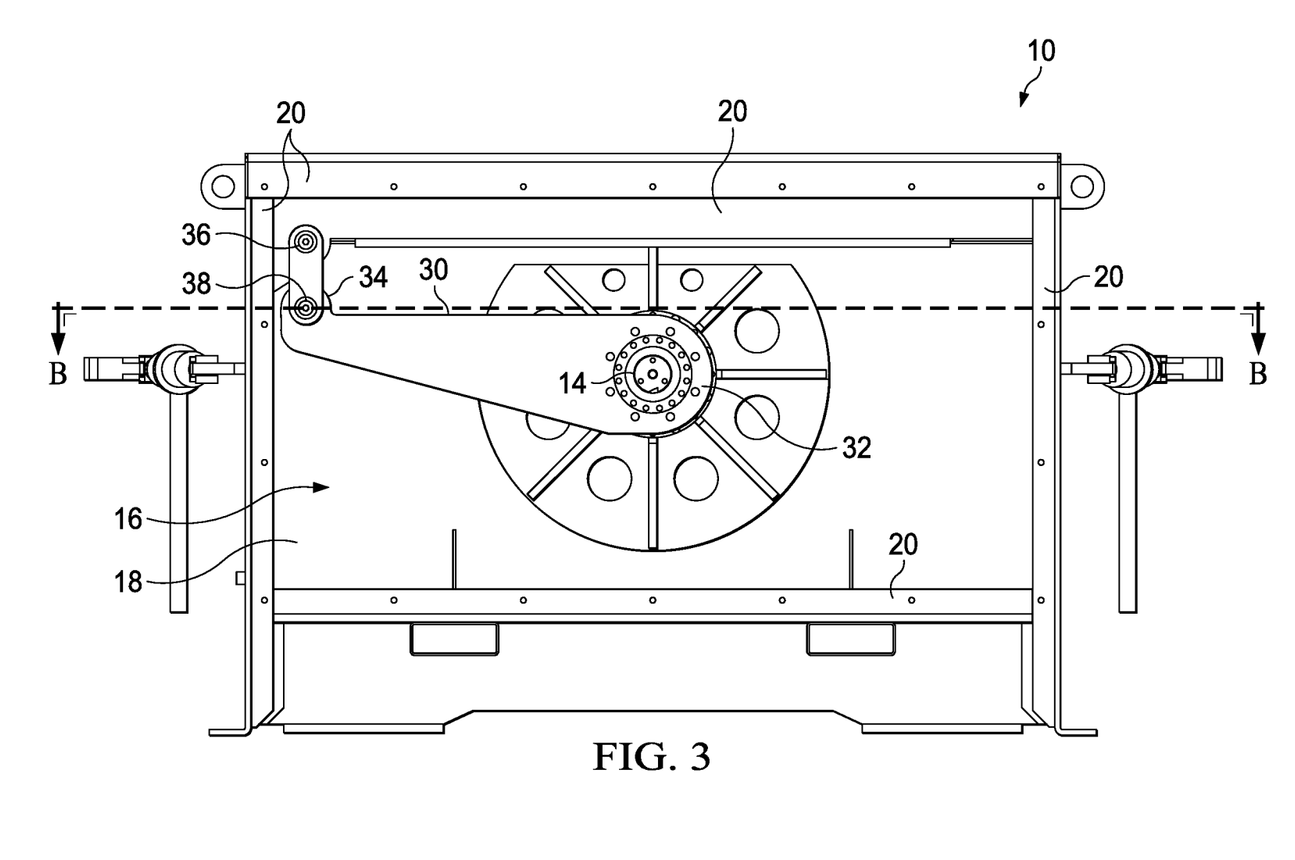
FIG. 3 is a side elevation view of the cantilevered screw assembly of FIG. 1, wherein portions have been removed for clarity.
Figure 4:
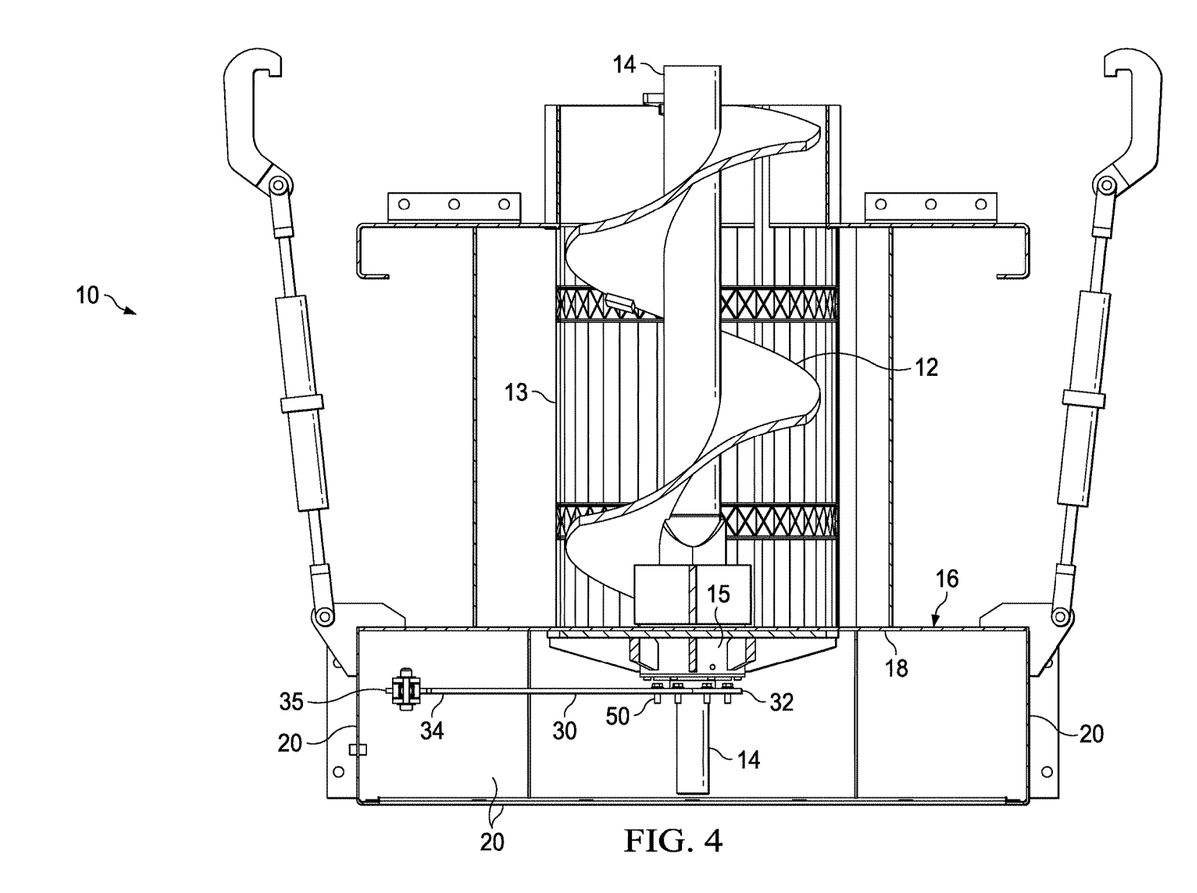
FIG. 4 is a cross-section view taken along line B-B of FIG. 3.

Such as shown in FIGS. 1 and 3, a proximal portion 34 of torque arm 30 is connected to wall assembly 16. More specifically, proximal portion 34 is connected to a frame structure 20 in this embodiment. Nevertheless, in some exemplary embodiments, a torque arm may be connected to another suitably stable structure that may not be directly associated with the wall assembly. Such as in this example, torque arm 30 is connected to wall assembly 16 (more specifically, frame structure 20) such that torque arm 30 is adapted to pivot relative to wall assembly 16 (more specifically, frame structure 20) to resist undesired movement of shaft 14 and speed reducer 40 during rotation of screw 12. In particular, in this exemplary embodiment, torque arm 30 includes or may be considered to be connected to a pivot assembly 35 that comprises at least two pivots 36 and 38 to facilitate resistance to undesired movement of shaft 14 and speed reducer 40 during rotation of screw 12. Moreover, in an exemplary embodiment, the pivotal connection(s) to wall assembly 16 may also allow for some flexibility and/or adjustability (while still maintaining desired resistance to undesired movement of shaft 14 and speed reducer 40), which may further assist with preventing breakage of the shaft, bearing(s) or bearing assembly, and/or any other portion of the cantilevered screw assembly 10.

Figure 5:
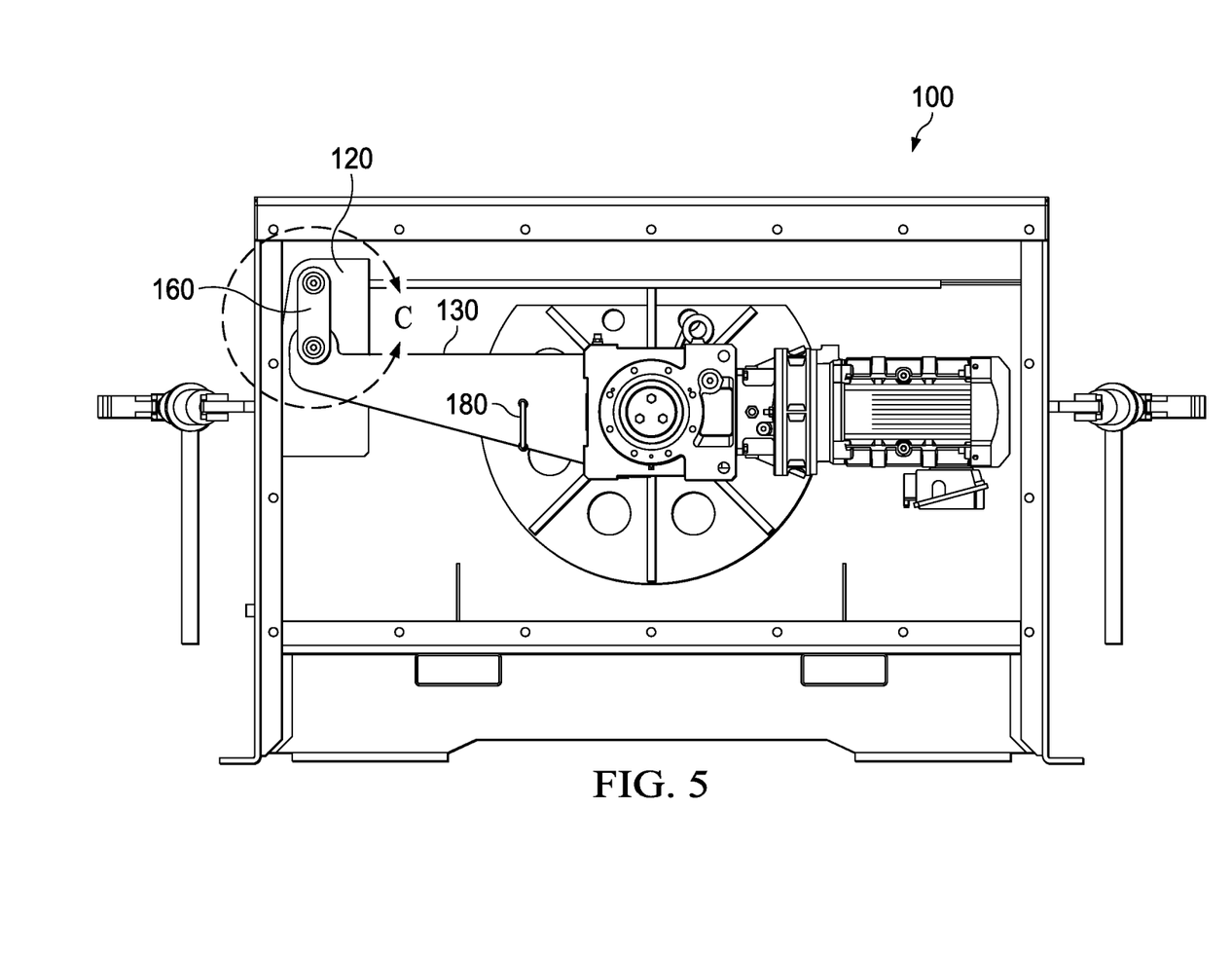
FIG. 5 is a side elevation view of a second exemplary embodiment of a cantilevered screw assembly.
Figure 6:
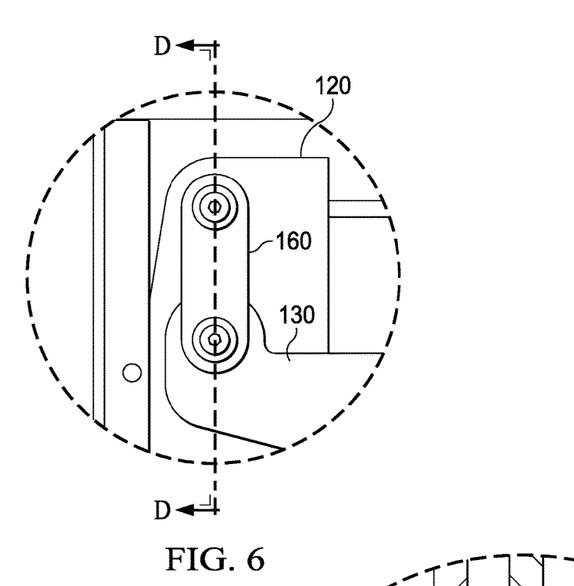
FIG. 6 is a detail view taken along line C of FIG. 5.
Figure 7:
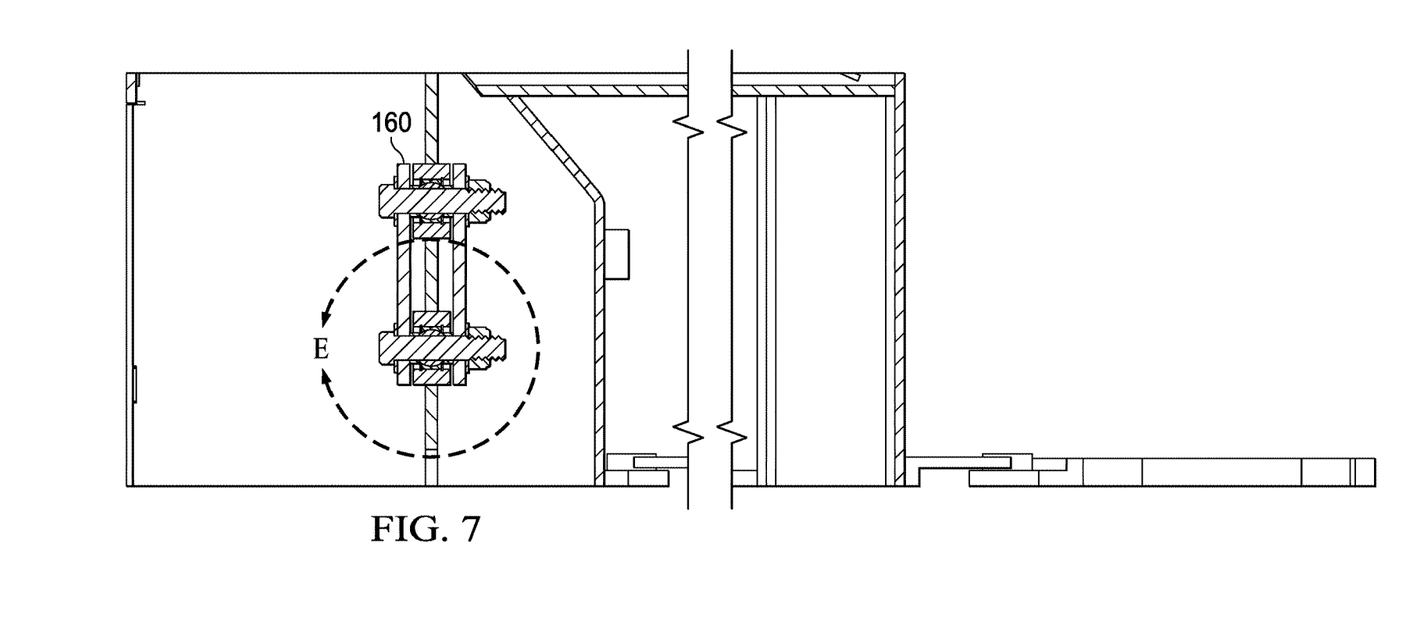
FIG. 7 is a cross-section view taken along line D-D of FIG. 6.
Figure 8:
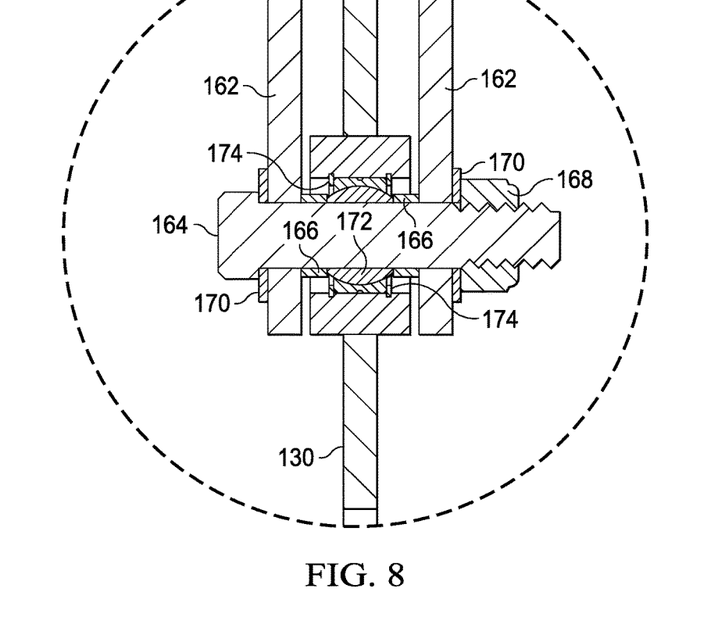
FIG. 8 is a detail view taken along line E of FIG. 7.

In the example of FIGS. 1-4, pivots 36 and 38 may be provided by a pin link with swivel bearings such as shown, wherein the pin link may be considered to be connected to or a portion of torque arm 30. Similarly, FIG. 5 shows an example of another cantilevered screw assembly 100 that may also utilize a pin link 160 with swivel bearings to facilitate pivoting of torque arm 130. FIGS. 6-8 show additional views of the assembly comprising pin link 160. In this example, pin link 160 comprises links (i.e., side plates) 162 and bolts 164. Each bolt 164 may extend through a respective spacer 166, which provides spacing between links 162, and engage a respective retaining unit 168 (e.g., nut). At least one washer 170 may be used to distribute the loads induced by each bolt 164 and retaining unit 168. Swivel bearings 172 (in association with snap rings 174) respectively facilitate the pivoting movement of pin link 160.

This embodiment of cantilevered screw assembly 100 may also include a link 180 that assists with connecting the torque arm 130 to the wall assembly. The cantilevered screw assembly 100 also includes a different frame structure 120 to which the pin link 160 is connected. Otherwise, the configuration and operation of cantilevered screw assemblies 10 and 100 may be similar.

Figure 9:
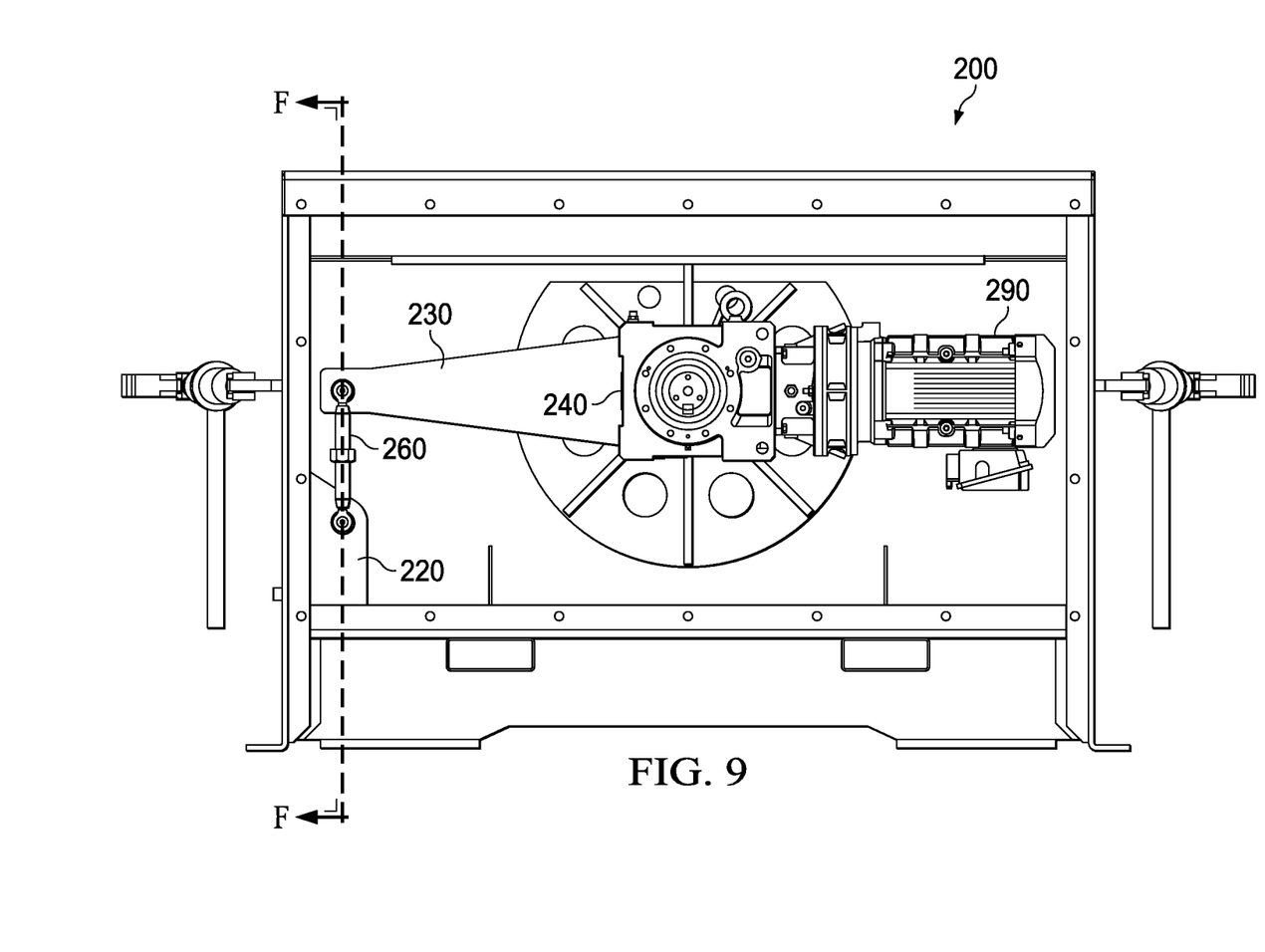
FIG. 9 is a side elevation view of a third exemplary embodiment of a cantilevered screw assembly.
Figure 10:
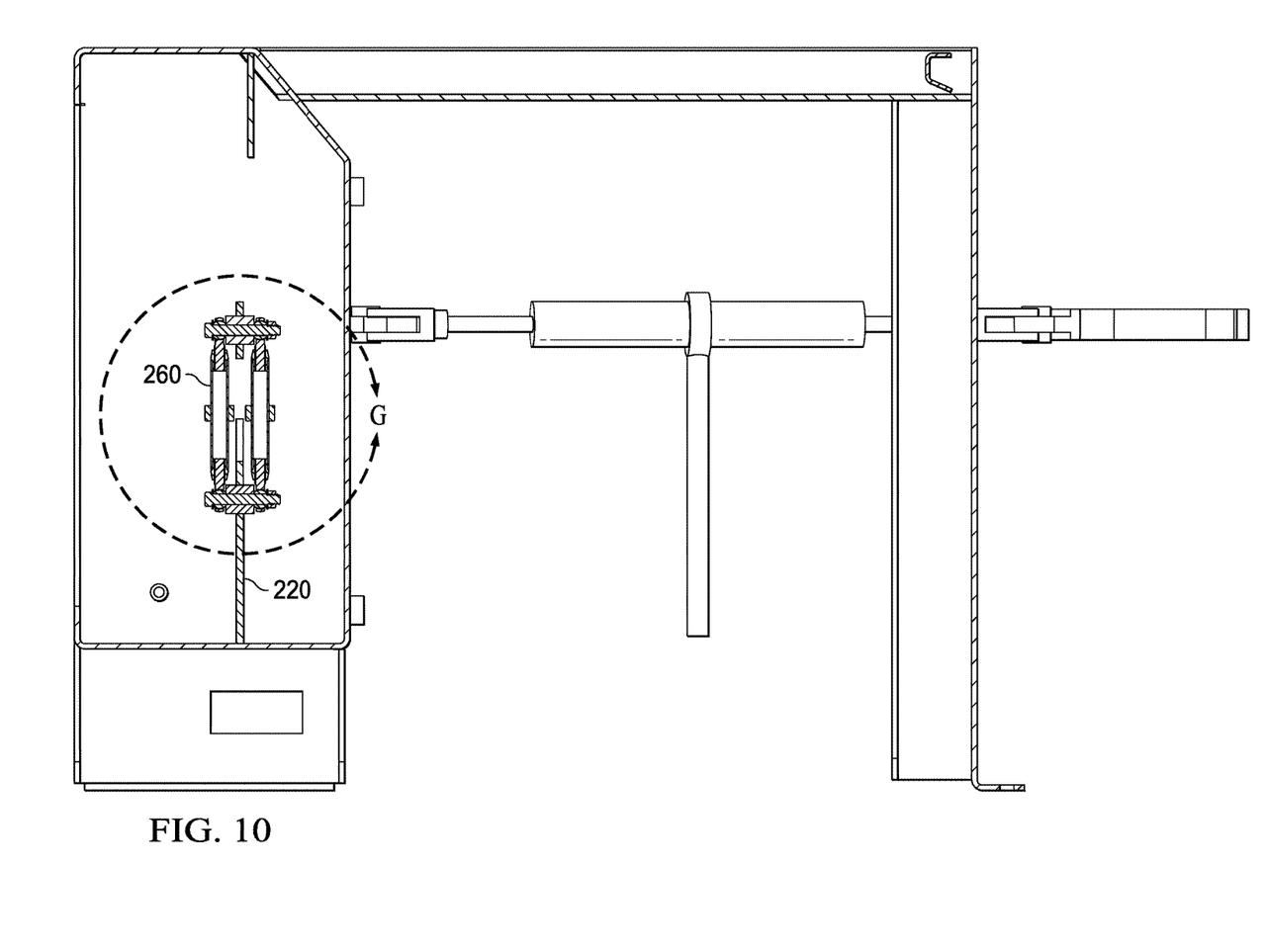
FIG. 10 is a cross-section view taken along line F-F of FIG. 9.
Figure 11:
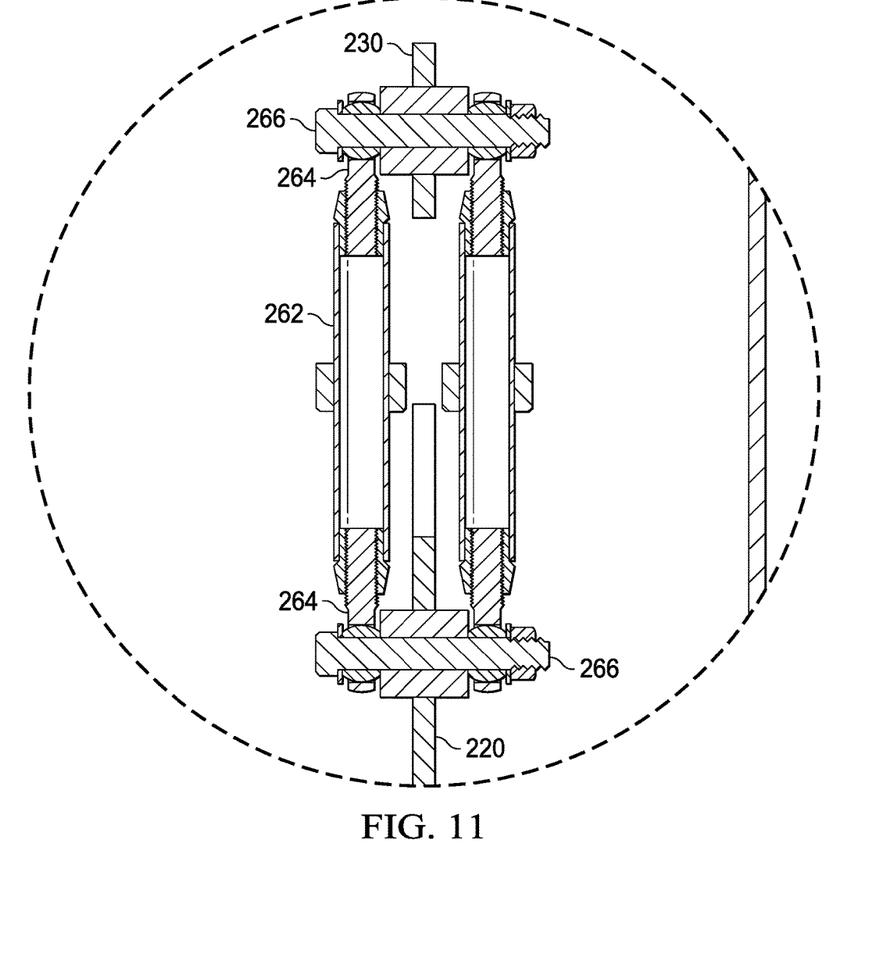
FIG. 11 is a detail view taken along line G of FIG. 10.

Other exemplary embodiments may utilize other pivoting mechanisms. For instance, FIG. 9 shows an exemplary embodiment of a cantilevered screw assembly 200 comprising a torque arm 230 that is connected to a speed reducer 240. In this embodiment, torque arm 230 comprises or has a swivel attachment 260 to a different frame structure 220 (relative to aforementioned frame structures 20 and 120 of previous embodiments). This example of swivel attachment 260 comprises a threaded tube assembly 262 in association with ball joint rod ends 264 to facilitate pivot points about connecting bolts 266. As a result, these pivotal connection(s) to a wall assembly may also allow for some flexibility and/or adjustability (while still maintaining desired resistance to undesired movement of a screw shaft and speed reducer 240), which may further assist with preventing breakage of the screw shaft, bearing(s) or bearing assembly, and/or any other portion of the cantilevered screw assembly 200. Thus, except as noted above, the configuration and operation of cantilevered screw assembly 200 may be similar to that of cantilevered screw assemblies 10 and 100.

Each of the aforementioned examples show a torque arm that includes or may be considered to be connected to a pivot assembly that comprises two pivots to facilitate the connection to a wall assembly. However, as mentioned, there may be more than two pivot points. Embodiments that comprise multiple pivot points may be adapted to provide particularly improved resistance to undesired movement(s) due to the added flexibility and/or adjustability that may further compensate for loads on the screw (while still providing desired resistance to at least one undesired movement of a speed reducer and/or an associated or end portion of a screw shaft). Nevertheless, some exemplary embodiments may only implement a single pivot point in the connection of a torque arm to a wall assembly.

Any suitable type of speed reducer may be utilized, unless otherwise specified. An example of a hollow shaft reducer (e.g., a keyed hollow bore) is perhaps best shown in FIG. 2. In particular, one example of a hollow shaft reducer is a Sumitomo Cyclo™ helical Buddybox™, which may be commercially available from Sumitomo Machinery Corporation of America. Nevertheless, other types of connections to a shaft of a screw are also possible including, but not limited to, splined connections, tapered shaft connections, shrink disc connections, rigid coupling connections, and other friction-based or mechanical connections.

In addition, a speed reducer may be powered by any suitable type of motor (see, e.g., motor 290 in FIG. 9). An electric motor may be preferred for some applications such as light or infrequent duty or small-scale operations. Nevertheless, even for light duty or small-scale operations, other types of motors may be used. Some other examples of suitable motors include, but are not limited to, hydraulic, gas, and pneumatic motors.

Any embodiment of the present invention may include any of the optional or preferred features of the other embodiments of the present invention. In view of the aforementioned design advantages, one exemplary embodiment of a speed reducer may essentially float on a torque arm (and the shaft of a screw) such that the torque arm is adapted to control or limit undesired movement of the speed reducer and screw during operation. As a result, an exemplary embodiment may effectively eliminate the need for alternative drive systems (e.g., chain and sprocket or hydraulic drives) or other means to control undesired movement of the screw. In addition, an example of a speed reducer may be substantially self-contained and therefore eliminate or limit potential problems associated with other heavy duty systems such as a misalignment of gears or leakage of fluids. Furthermore, in light of the aforementioned advantages, an exemplary embodiment may be particularly useful for light or infrequent duty or other small-scale applications to reduce the likelihood of a breakage of a screw or another portion of a cantilevered screw assembly (e.g., the bearing(s) or bearing assembly, the gears, etc.). Nevertheless, as aforementioned, some exemplary embodiments may also be utilized for heavy or frequent duty or other large-scale applications.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A screw assembly comprising:
   a wall assembly;
   a screw comprising a shaft cantilevered to said wall assembly;
   a speed reducer associated with said shaft of said screw, said speed reducer adapted to facilitate rotation of said screw; and
   a torque arm connected to said wall assembly and said speed reducer such that said torque arm is adapted to resist undesired movement of said speed reducer during rotation of said screw;
   wherein a proximal portion of said torque arm is connected to said wall assembly, and a distal portion of said torque arm extends completely around said shaft of said screw.

2. The screw assembly of claim 1 wherein said shaft of said screw is hollow.

3. The screw assembly of claim 1 wherein said speed reducer is a hollow shaft reducer.

4. The screw assembly of claim 1 wherein:
   said shaft of said screw is hollow; and
   said speed reducer is a hollow shaft reducer.

5. The screw assembly of claim 1 wherein said torque arm is connected to said speed reducer by at least one fastener.

6. The screw assembly of claim 1 wherein said torque arm is adapted to limit orbital movement of said speed reducer during rotation of said screw.

7. The screw assembly of claim 1 wherein said torque arm is adapted to limit at least one of the following types of movement of said speed reducer during rotation of said screw: clockwise movement, counterclockwise movement, curved movement, angular movement, vertical movement, horizontal movement, and tilting movement.

8. The screw assembly of claim 1 wherein said torque arm is associated with said shaft of said screw such that said torque arm is adapted to resist undesired movement of said shaft during rotation of said screw.

9. The screw assembly of claim 1 wherein said torque arm comprises at least two pivots to facilitate resistance to undesired movement of said speed reducer during rotation of said screw.

10. The screw assembly of claim 1 wherein said torque arm is adapted to pivot relative to said wall assembly to resist undesired movement of said shaft during rotation of said screw.

11. The screw assembly of claim 1 wherein said torque arm comprises at least two pivots to facilitate resistance to undesired movement of said shaft during rotation of said screw.

12. A screw assembly comprising:
    a wall assembly;
    a screw comprising a shaft cantilevered to said wall assembly;
    a speed reducer associated with said shaft of said screw, said speed reducer adapted to facilitate rotation of said screw; and
    a torque arm connected to said wall assembly and said speed reducer and associated with said shaft of said screw such that said torque arm is adapted to resist undesired movement of said shaft during rotation of said screw;
    wherein a proximal portion of said torque arm is connected to said wall assembly, and a distal portion of said torque arm extends completely around said shaft of said screw.

13. The screw assembly of claim 12 wherein said shaft of said screw is hollow.

14. The screw assembly of claim 12 wherein said speed reducer is a hollow shaft reducer.

15. The screw assembly of claim 12 wherein:
    said shaft of said screw is hollow; and
    said speed reducer is a hollow shaft reducer.

16. The screw assembly of claim 12 wherein said torque arm is connected to said speed reducer by at least one fastener.

17. The screw assembly of claim 12 wherein said torque arm is adapted to limit orbital movement of an end portion of said shaft of said screw during rotation of said screw.

18. The screw assembly of claim 12 wherein said torque arm is adapted to limit at least one of the following types of movement of said end portion of said shaft of said screw during rotation of said screw: clockwise movement, counterclockwise movement, curved movement, angular movement, vertical movement, horizontal movement, and tilting movement.

19. The screw assembly of claim 12 wherein said torque arm is adapted to pivot relative to said wall assembly to resist undesired movement of said speed reducer during rotation of said screw.

20. The screw assembly of claim 12 wherein said torque arm comprises at least two pivots to facilitate resistance to undesired movement of said speed reducer during rotation of said screw.

21. The screw assembly of claim 12 wherein said torque arm comprises at least two pivots to facilitate resistance to undesired movement of said shaft during rotation of said screw.

22. A screw assembly comprising:
a wall assembly;
a screw comprising a shaft cantilevered to said wall assembly;
a speed reducer associated with said shaft of said screw, said speed reducer adapted to facilitate rotation of said screw; and
a torque arm connected to said wall assembly and said speed reducer such that said torque arm is adapted to pivot relative to said wall assembly to resist undesired movement of said speed reducer during rotation of said screw.

23. The screw assembly of claim 22 wherein said shaft of said screw is hollow.

24. The screw assembly of claim 22 wherein said speed reducer is a hollow shaft reducer.

25. The screw assembly of claim 22 wherein:
said shaft of said screw is hollow; and
said speed reducer is a hollow shaft reducer.

26. The screw assembly of claim 22 wherein:
a proximal portion of said torque arm is connected to said wall assembly; and
a distal portion of said torque arm extends completely around said shaft of said screw.

27. The screw assembly of claim 22 wherein said torque arm is connected to said speed reducer by at least one fastener.

28. The screw assembly of claim 22 wherein said torque arm is adapted to limit orbital movement of said speed reducer during rotation of said screw.

29. The screw assembly of claim 22 wherein said torque arm is adapted to limit at least one of the following types of movement of said speed reducer during rotation of said screw: clockwise movement, counterclockwise movement, curved movement, angular movement, vertical movement, horizontal movement, and tilting movement.

30. The screw assembly of claim 22 wherein said torque arm comprises at least two pivots to facilitate resistance to undesired movement of said speed reducer during rotation of said screw.

31. The screw assembly of claim 22 wherein said torque arm is associated with said shaft of said screw such that said torque arm is adapted to resist undesired movement of said shaft during rotation of said screw.

32. The screw assembly of claim 22 wherein said torque arm is adapted to pivot relative to said wall assembly to resist undesired movement of said shaft during rotation of said screw.

33. The screw assembly of claim 22 wherein said torque arm comprises at least two pivots to facilitate resistance to undesired movement of said shaft during rotation of said screw.

34. A screw assembly comprising:
a wall assembly;
a screw comprising a shaft cantilevered to said wall assembly;
a speed reducer associated with said shaft of said screw, said speed reducer adapted to facilitate rotation of said screw; and
a torque arm connected to said wall assembly and said speed reducer and associated with said shaft of said screw such that said torque arm is adapted to pivot relative to said wall assembly to resist undesired movement of said shaft during rotation of said screw.

35. The screw assembly of claim 34 wherein said shaft of said screw is hollow.

36. The screw assembly of claim 34 wherein said speed reducer is a hollow shaft reducer.

37. The screw assembly of claim 34 wherein:
said shaft of said screw is hollow; and
said speed reducer is a hollow shaft reducer.

38. The screw assembly of claim 34 wherein:
a proximal portion of said torque arm is connected to said wall assembly; and
a distal portion of said torque arm extends completely around said shaft of said screw.

39. The screw assembly of claim 34 wherein said torque arm is connected to said speed reducer by at least one fastener.

40. The screw assembly of claim 34 wherein said torque arm is adapted to limit orbital movement of said speed reducer during rotation of said screw.

41. The screw assembly of claim 34 wherein said torque arm is adapted to limit at least one of the following types of movement of said speed reducer during rotation of said screw: clockwise movement, counterclockwise movement, curved movement, angular movement, vertical movement, horizontal movement, and tilting movement.

42. The screw assembly of claim 34 wherein said torque arm comprises at least two pivots to facilitate resistance to undesired movement of said speed reducer during rotation of said screw.

43. The screw assembly of claim 34 wherein said torque arm is adapted to resist undesired movement of said speed reducer during rotation of said screw.

44. The screw assembly of claim 34 wherein said torque arm comprises at least two pivots to facilitate resistance to undesired movement of said shaft during rotation of said screw.

* * * * *